(12) United States Patent
Hardesty et al.

(10) Patent No.: US 9,157,744 B2
(45) Date of Patent: Oct. 13, 2015

(54) PRECISION MULTIPLE VEHICLE NAVIGATION SYSTEM

(71) Applicant: The Boeing Company, Chicago, IL (US)

(72) Inventors: William Mark Hardesty, Chandler, AZ (US); Don G. Caldwell, Mesa, AZ (US); Dino A. Cerchie, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 13/664,725

(22) Filed: Oct. 31, 2012

(65) Prior Publication Data

US 2015/0025797 A1 Jan. 22, 2015

Related U.S. Application Data

(60) Provisional application No. 61/680,129, filed on Aug. 6, 2012.

(51) Int. Cl.
*G01S 19/03* (2010.01)
*G01C 21/16* (2006.01)
(Continued)

(52) U.S. Cl.
CPC ............. *G01C 21/165* (2013.01); *G01C 21/24* (2013.01); *G01C 21/26* (2013.01); *G01S 19/03* (2013.01); *G01S 19/47* (2013.01); *G01S 19/50* (2013.01); *G05D 1/0684* (2013.01); *G05D 1/104* (2013.01)

(58) Field of Classification Search
CPC ....... G01S 19/42; G01S 19/258; G01S 19/30; G01S 19/29; G01S 19/03; G01S 19/47; G01S 19/50; G01C 21/28; G01C 21/165; A01B 12/006

USPC ......... 701/3, 301, 36, 400, 408, 41, 468, 469, 701/470, 472, 482; 342/357.48, 357.31, 342/357.27
See application file for complete search history.

(56) References Cited

U.S. PATENT DOCUMENTS 6,005,513 A 12/1999 Hardesty
2006/0074558 A1* 4/2006 Williamson et al. .......... 701/213
(Continued)

FOREIGN PATENT DOCUMENTS

EP 1868008 A1 12/2007
WO 9608730 A1 3/1996

OTHER PUBLICATIONS

Ford et al., "Helicopter Ship Board Landing System," Proceedings of the 18th International Technical Meeting of the Satellite Division of the Institute of Navigation, Sep. 2005, 10 Pages.
Caveney, "Cooperative Vehicular Safety Applications," IEEE Control Systems Magazine, Aug. 2010, vol. 20, No. 4, pp. 38-53.
EPO Search Report dated Dec. 17, 2013, regarding Application No. EP13177428, 7 pages.

*Primary Examiner* — Helal A Algahaim
*Assistant Examiner* — Jelani Smith
(74) *Attorney, Agent, or Firm* — Yee & Associates, P.C.

(57) ABSTRACT

A method and apparatus for managing movement. A navigation system comprises a first inertial measurement unit enabled global positioning system device having a first inertial measurement unit with a first level of accuracy in a first vehicle and is configured to provide first information that identifies a position of the first vehicle relative to a second vehicle. The navigation system further comprises a second inertial measurement unit enabled global positioning system device in the first vehicle having a second inertial measurement unit with a second level of accuracy that is greater than the first level of accuracy and is configured to provide second information that identifies the position of the first vehicle relative to the second vehicle. The navigation system further comprises a controller that is configured to perform an action based on a desired level of accuracy of the first information.

18 Claims, 6 Drawing Sheets

(51) Int. Cl.
*G01S 19/47* (2010.01)
*G01S 19/50* (2010.01)
*G05D 1/06* (2006.01)
*G05D 1/10* (2006.01)
*G01C 21/24* (2006.01)
*G01C 21/26* (2006.01)

(56) References Cited

U.S. PATENT DOCUMENTS

2006/0106511 A1\* 5/2006 Milelli et al. .................... 701/33
2007/0016371 A1\* 1/2007 Waid et al. .................... 701/213

\* cited by examiner

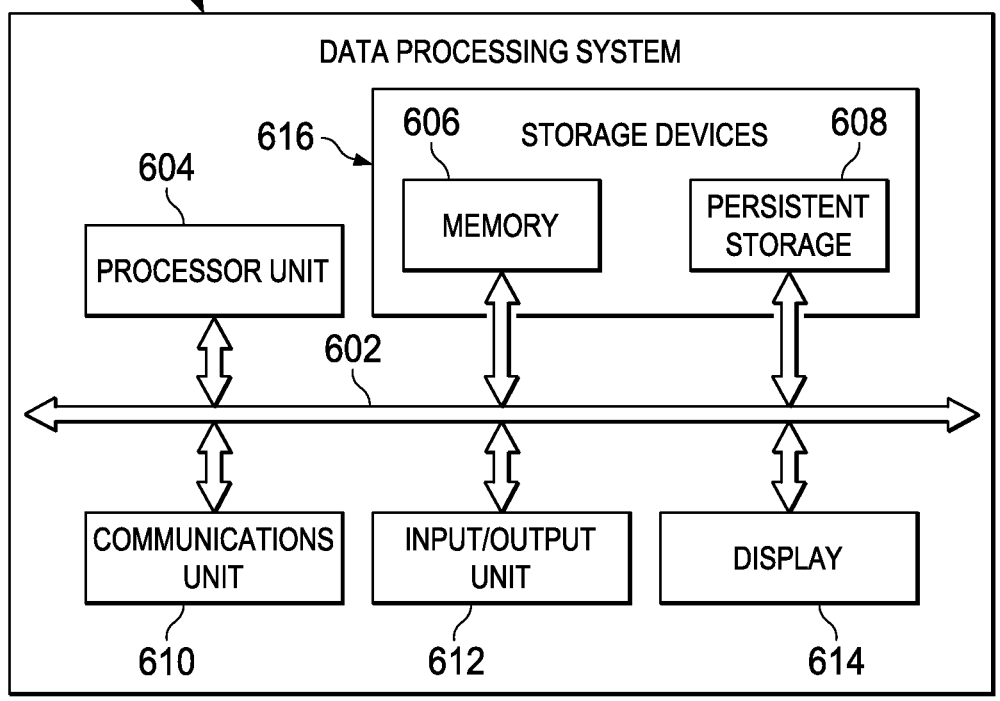
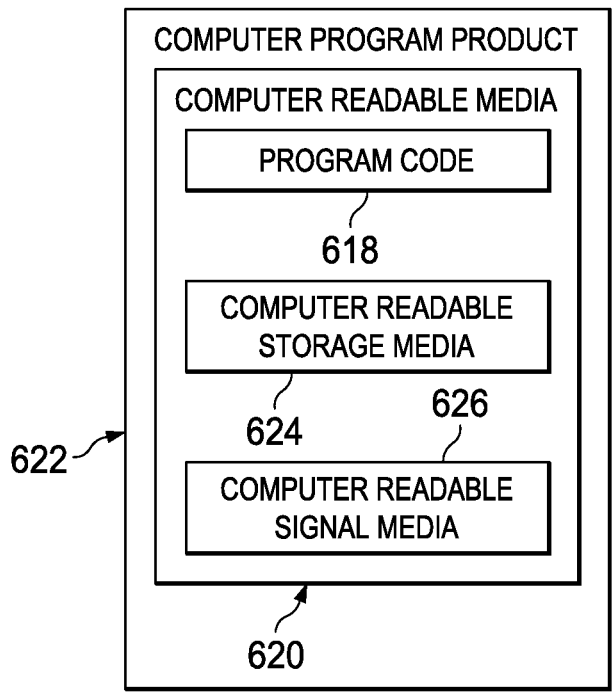
FIG. 6

PRECISION MULTIPLE VEHICLE NAVIGATION SYSTEM

RELATED PROVISIONAL APPLICATION

This application is related to and claims the benefit of priority of provisional U.S. Patent Application Ser. No. 61/680,129, filed Aug. 6, 2012, entitled "Precision Multiple Vehicle Navigation System", which is incorporated herein by reference.

BACKGROUND INFORMATION

1. Field

The present disclosure relates generally to vehicles and, in particular, to navigation systems for vehicles. Still more particularly, the present disclosure relates to a method and apparatus for providing navigation to vehicles moving relative to each other.

2. Background

Vehicles, such as aircraft, commonly use navigation systems that include global positioning system devices to provide information about the position of the aircraft. With the information about the position of the aircraft, a pilot, autopilot, or other operator may guide the aircraft during various phases of flight such as take-off, climbing, level flight, descending, and landing.

For example, a global positioning system device may be used to provide information to a pilot as to whether the aircraft is turning at desired waypoints along a flight plan. As another example, a global positioning system device also may be used to provide position information to land the aircraft at a desired location.

Aircraft may use these global positioning system devices to identify their position relative to other objects that have fixed positions. For example, when a helicopter lands at an airport, the landing pad for the helicopter has a fixed position on the ground. As a result, the pilot of the helicopter may use the position of the helicopter and information about the location of the landing pad in a mapped database to land as desired.

In some cases, the object may move relative to the vehicle. For example, a helicopter landing on an aircraft carrier or other surface ship is unable to rely only on the position of the helicopter. Instead, the helicopter may also receive information from the surface ship as to the position of the surface ship relative to the helicopter. This information may aid in landing the helicopter on the surface ship.

This type of information may be provided by a navigation system on the helicopter, the surface ship, or both the helicopter and the surface ship. In some cases, a navigation system on both the helicopter and the surface ship may communicate with each other such that the helicopter knows where it is located relative to the surface ship. For example, the operator of the helicopter may want to know with a desired level of accuracy where the center of a helipad is located on the surface ship.

When the two navigation systems communicate with each other, the pilot of the helicopter may provide information needed to know where the location of the helicopter is relative to the helipad with a desired level of accuracy. These navigation systems include global positioning system devices to provide the desired level of accuracy.

These navigation systems communicate with each other over wireless communications links. These wireless communications links, however, may not always be as reliable as desired. In some cases, a temporary loss in communication between the navigation systems may occur. As a result, the helicopter may not receive information identifying the location of the helicopter relative to the surface ship as precisely as desired when a loss of communication occurs temporarily between the navigation system on the helicopter and the navigation system on the surface ship.

Therefore, it would be desirable to have a method and apparatus that takes into account at least some of the issues discussed above, as well as other possible issues.

SUMMARY

In one illustrative embodiment, a navigation system comprises a first inertial measurement unit enabled global positioning system device, a second inertial measurement unit enabled global positioning system device, and a controller. The first inertial measurement unit enabled global positioning system device has a first inertial measurement unit with a first level of accuracy in a first vehicle. The first inertial measurement unit enabled global positioning system device is configured to provide first information that identifies a position of the first vehicle relative to a second vehicle. The second inertial measurement unit enabled global positioning system device in the first vehicle has a second inertial measurement unit with a second level of accuracy that is greater than the first level of accuracy. The second inertial measurement unit enabled global positioning system device is configured to provide second information that identifies the position of the first vehicle relative to the second vehicle. The controller is configured to perform an action based on a desired level of accuracy of the first information.

In another illustrative embodiment, a method for processing navigation information in a navigation system is provided. First information is received from a first inertial measurement unit enabled global positioning system device having a first inertial measurement unit with a first level of accuracy in a first vehicle. The first information identifies a position of the first vehicle relative to a second vehicle. Second information is received from a second inertial measurement unit enabled global positioning system device in the first vehicle having a second inertial measurement unit with a second level of accuracy that is greater than the first level of accuracy. The second information identifies the position of the first vehicle relative to the second vehicle. An action is performed based on a desired level of accuracy of the first information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a data processing system in accordance with an illustrative embodiment.

DETAILED DESCRIPTION

The illustrative embodiments recognize and take into account one or more different considerations. The illustrative embodiments recognize and take into account that a navigation system may involve one navigation system being a master navigation system while the other navigation system is a slave or secondary navigation system. The master navigation system identifies its position. This identification of the location may have some error based on the manner in which global positioning system satellite signals are received. However, the secondary navigation system may use the same error correction as the master navigation system such that a desired level of accuracy is present in identifying the location between two vehicles.

The illustrative embodiments also recognize and take into account that when communication is lost, the secondary navigation system is unable to obtain navigation information such as the position of the master navigation system and error correction information used by the master navigation system. In other situations, the secondary navigation system may not perform as desired due to hardware or software in the secondary navigation system not performing as desired or an inability to obtain a global positioning system signal. In either case, the secondary navigation system may be unable to identify its location with a desired level of accuracy.

Thus, the illustrative embodiments provide a method and apparatus for identifying positions of vehicles. One illustrative embodiment provides a navigation system. The navigation system comprises a first inertial measurement unit enabled global positioning system device, a second inertial measurement unit enabled global positioning system device, and a controller.

The first inertial measurement unit enabled global positioning system device has a first inertial measurement unit with a first level of accuracy in a first vehicle. The first inertial measurement unit enabled global positioning system device is configured to provide first information that identifies a position of the first vehicle relative to a second vehicle.

The second inertial measurement unit enabled global positioning system device in the first vehicle has a second inertial measurement unit with a second level of accuracy that is greater than the first level of accuracy. The second inertial measurement unit enabled global positioning system device is configured to provide second information that identifies a position on the first vehicle. The controller is configured to perform an action based on a desired level of accuracy of the first information received from the first inertial measurement unit enabled global positioning system device.

Figure 1:
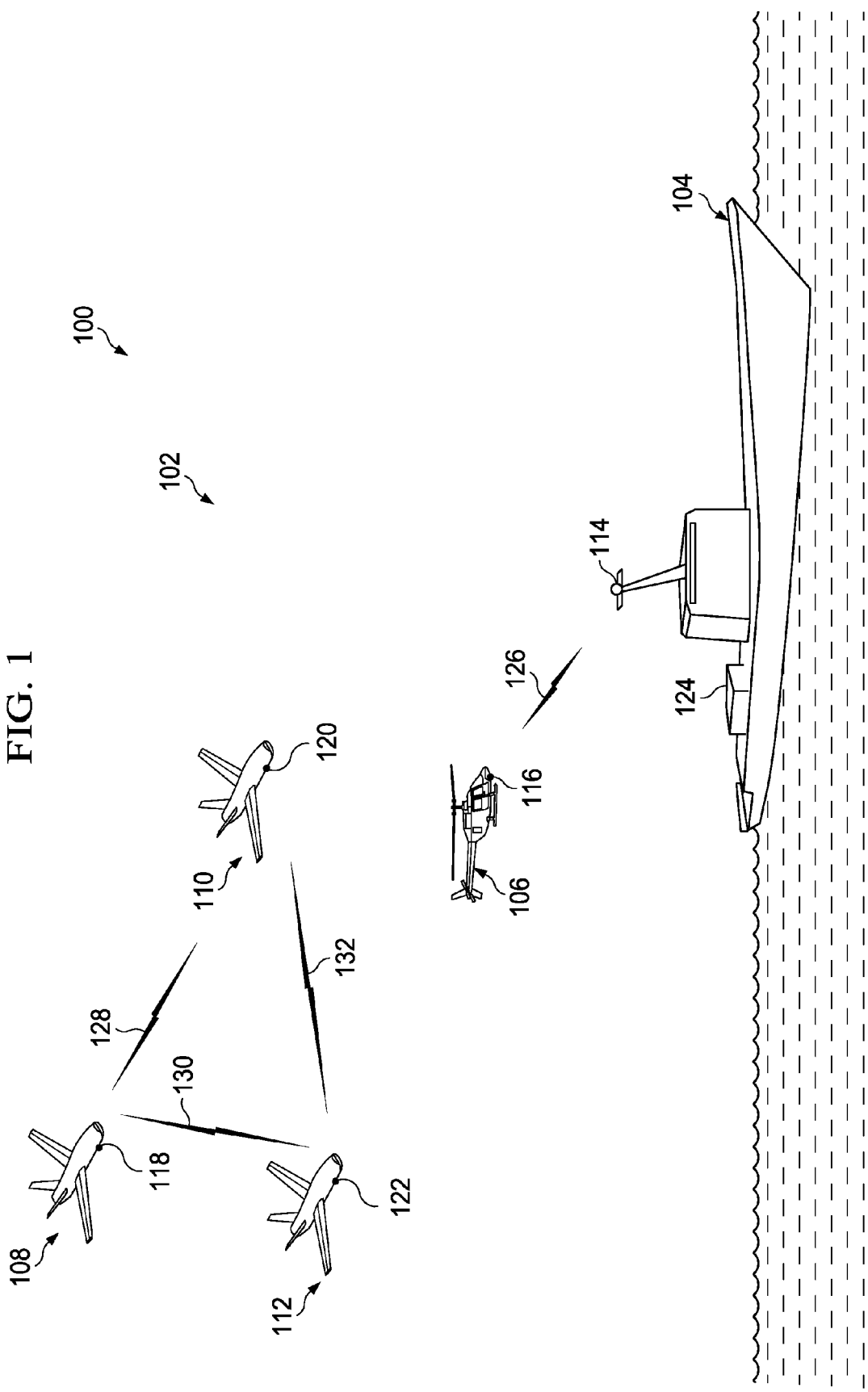
FIG. 1 is an illustration of a navigation environment in accordance with an illustrative embodiment.

With reference now to the figures and, in particular, with reference to FIG. 1, an illustration of a navigation environment is depicted in accordance with an illustrative embodiment. In this illustrative example, navigation environment 100 includes vehicles 102.

As depicted, vehicles 102 include ship 104, helicopter 106, airplane 108, airplane 110, and airplane 112. As depicted, helicopter 106 may fly to land on ship 104 while ship 104 moves. Airplane 108, airplane 110 and airplane 112 may fly in a formation in this illustrative example.

These different types of movement of vehicles 102 may be performed using navigation systems in vehicles 102. For example, ship 104 has navigation system 114; helicopter 106 has navigation system 116; airplane 108 has navigation system 118; airplane 110 has navigation system 120; and airplane 112 has navigation system 122. In these illustrative examples, these navigation systems may provide information about the positions of vehicles 102 relative to each other.

This information may be used to maintain the formation of airplane 108, airplane 110, and airplane 112 with a desired level of precision. Further, the information may be used by helicopter 106 to land on helipad 124 on ship 104 with a desired level of precision.

In these illustrative examples, the information, such as navigation information, is exchanged between vehicles 102 using wireless communications links. For example, helicopter 106 may exchange information with ship 104 through wireless communications link 126. Airplane 108 may exchange information with airplane 110 using wireless communications link 128. Airplane 108 may exchange information with airplane 112 using wireless communications link 130. Airplane 110 may exchange information with airplane 112 using wireless communications link 132.

The illustrative embodiments recognize and take into account that the wireless communications links may not always function as desired. For example, wireless communications link 126 between helicopter 106 and ship 104 may become lost or may not have a desired level of quality. As a result, helicopter 106 and ship 104 are unable to exchange navigation information until wireless communications link 126 functions as desired.

In some cases, navigation system 116 in helicopter 106 or navigation system 114 in ship 104 may not perform as desired. The inability of one or more of these navigation systems to perform as desired may result from hardware not performing as desired or an ability to obtain a desired global positioning system signal.

As a result, helicopter 106 may still land on helipad 124, but the landing may not have a desired level of precision. The operator of helicopter 106 may be unable to perform as many operations as desired when landing helicopter 106 on helipad 124 on ship 104. Further, increased attention and focus may be required by the operator of helicopter 106 to obtain a desired level of precision for landing helicopter 106 on helipad 124.

In some cases, the landing may be aborted until wireless communications link 126 is re-established or has a desired level of quality. For example, if helicopter 106 is an unmanned aerial vehicle, the camera system on helicopter 106 may not provide sufficient views for a remote operator of helicopter 106 to land helicopter 106 in a desired manner on helipad 124.

In yet another illustrative example, if one or more of wireless communications link 128, wireless communications link 130, and wireless communications link 132 do not function as desired, or if one or more of navigation system 118, navigation system 120, or navigation system 122 are not functioning as desired, airplane 108, airplane 110, and airplane 112 may not fly in a formation with a desired level of precision. For example, airplane 108, airplane 110, and airplane 112 may not be able to fly as close to each other as desired in the formation during different maneuvers. The separation between airplane 108, airplane 110, and airplane 112 may be increased, which may be undesirable in this situation.

In these illustrative examples, the different navigation systems may be implemented using an illustrative embodiment that allows for more accuracy, redundancy, or both accuracy and redundancy in the situations described above. When the different navigation systems in vehicles 102 are implemented in accordance with an illustrative embodiment, the loss of wireless communications links, an undesired quality of the wireless communications links, or undesired operation of software, hardware, or both software and hardware may still allow vehicles 102 to operate as desired.

The illustration of navigation environment 100 in FIG. 1 is not meant to imply limitations to the manner in which illustrative embodiments may be implemented. For example, other types of vehicles may implement navigation systems in accordance with an illustrative embodiment other than those depicted in navigation environment 100. Vehicles 102 may also include at least one of a carrier, a spacecraft, a missile, submarine, a car, a tank, a tanker aircraft, a train, and other suitable types of vehicles.

Figure 2:
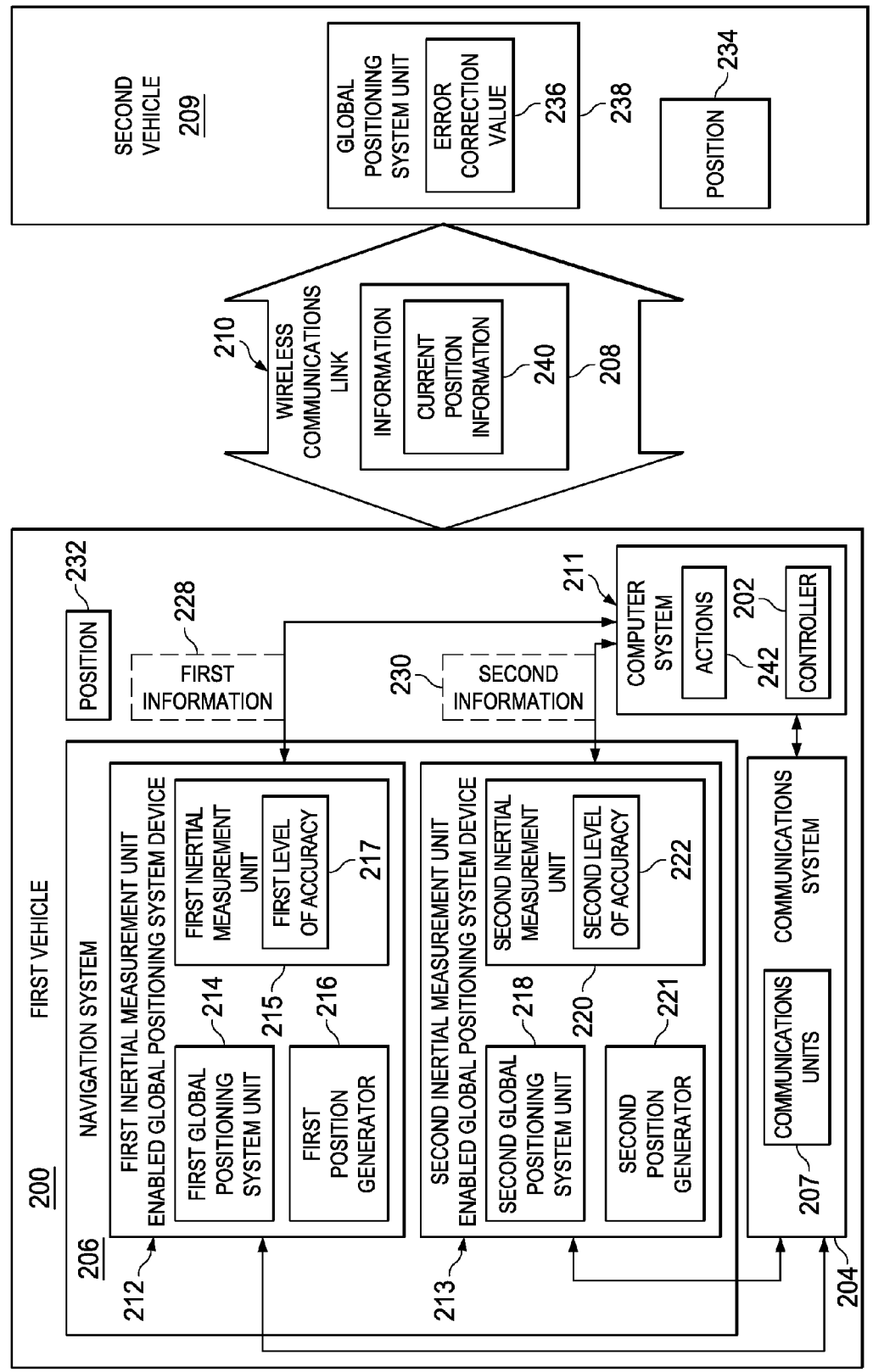
FIG. 2 is an illustration of a block diagram of a navigation system for a vehicle in accordance with an illustrative embodiment.

With reference now to FIG. 2, an illustration of a block diagram of a navigation system for a vehicle is depicted in accordance with an illustrative embodiment. In this illustrative example, first vehicle 200 includes controller 202, communications system 204, and navigation system 206. Vehicles 102 in FIG. 1 are illustrative examples of some possible physical implementations for first vehicle 200 shown in block form in this figure.

Communications system 204 includes a number of communication units 207. As used herein, a "number of" when used with reference to items means one or more items. For example, a number of communications units is one or more communications units. In this illustrative example, communications system 204 may be used to exchange information 208 with second vehicle 209 over wireless communications link 210.

Controller 202 is configured to control the operation of first vehicle 200. In controlling the operation of first vehicle 200, controller 202 may control first vehicle 200 automatically, with input from a human operator, or some combination thereof. Controller 202 may be implemented in hardware, software, or a combination of the two. For example, controller 202 may be implemented as hardware or software in computer system 211 in this illustrative example.

Computer system 211 is one or more computers. When more than one computer is present, those computers may be in communication with each other via a communications medium such as a network. Controller 202 may be, for example, a flight control computer when first vehicle 200 is an aircraft. For example, controller 202 may be a flight control computer in airplane 108 or helicopter 106 in FIG. 1. Of course, controller 202 may be other types of computers in other vehicles 102 depending on the particular implementation.

Navigation system 206 is an example of a navigation system that may be implemented in vehicles 102 in FIG. 1. As depicted, navigation system 206 includes first inertial measurement unit enabled global positioning system device 212 and second inertial measurement unit enabled global positioning system device 213.

In this illustrative example, first inertial measurement unit enabled global positioning system device 212 is a hardware device and may include software. First inertial measurement unit enabled global positioning system device 212 has first global positioning system unit 214, first inertial measurement unit 215, and first position generator 216. First inertial measurement unit 215 has first level of accuracy 217.

Further, second inertial measurement unit enabled global positioning system device 213 is a hardware device and may include software. Second inertial measurement unit enabled global positioning system device 213 has second global positioning system unit 218, second inertial measurement unit 220, and second position generator 221. Second inertial measurement unit 220 has second level of accuracy 222. Second level of accuracy 222 is greater than first level of accuracy 217.

In these illustrative examples, first global positioning system unit 214 and second global positioning system unit 218 are hardware devices that receive global positioning system signals from satellites. These devices are configured to identify a current position of the devices on Earth. The positions in these examples may be in three dimensions. For example, the positions may be described using longitude, latitude, and altitude.

First inertial measurement unit 215 and second inertial measurement unit 220 are hardware devices configured to measure position information about a vehicle. For example, first inertial measurement unit 215 and second inertial measurement unit 220 may each measure at least one of velocity, orientation, and other information about first vehicle 200.

As depicted, first position generator 216 and second position generator 221 may be hardware, software, or a combination of the two. These devices may process information generated by other hardware within first inertial measurement unit enabled global positioning system device 212 and second inertial measurement unit enabled global positioning system device 213.

For example, first position generator 216 may process information generated by first global positioning system unit 214, first inertial measurement unit 215, or both. In a similar fashion, second position generator 221 may process information generated by second global positioning system unit 218, second inertial measurement unit 220, or both second global positioning system unit 218 and second inertial measurement unit 220. This processing may include, for example, at least one of filtering the information, applying error correction to the information, performing calculations using the information, and other suitable types of operations.

The information processed by first position generator 216 and second position generator 221 may be sent to controller 202 in computer system 211 as first information 228 and second information 230, respectively. In some cases, processing by first position generator 216, second position generator 221, or both first position generator 216 and second position generator 221 may not be necessary to send first information 228 and second information 230 to controller 202.

In one illustrative example, first inertial measurement unit enabled global positioning system device 212 is configured to provide first information 228. First information 228 is information that identifies position 232 of first vehicle 200 relative to position 234 of second vehicle 209. In this illustrative example, position 232 may be the position of first inertial measurement unit enabled global positioning system device 212 within first vehicle 200.

As depicted, position 232 of first vehicle 200 is relative to position 234 of second vehicle 209 when information about position 232 generated by first global positioning system unit 214 is adjusted using the same error correction value 236 used by global positioning system unit 238 in second vehicle 209. Position 234 and error correction value 236 are received by first inertial measurement unit enabled global positioning system device 212 through communications system 204 in current position information 240 sent over wireless communications link 210 as part of information 208.

Current position information 240 may include at least one of a three-dimensional location, an attitude, error correction information, a velocity, and a heading for second vehicle 209. In particular, error correction information in current position information 240 may be applied by first position generator 216 to a position identified by first global positioning system unit 214 to generate first information 228.

In this illustrative example, second inertial measurement unit enabled global positioning system device 213 is configured to provide second information 230. Second information 230 is information that identifies position 232 of first vehicle 200 in these illustrative examples.

As depicted, controller 202 may perform a number of actions 242 based on an accuracy of first information 228. In these illustrative examples, the accuracy of first information 228 may be made by comparing first information 228 with second information 230.

Figure 3:
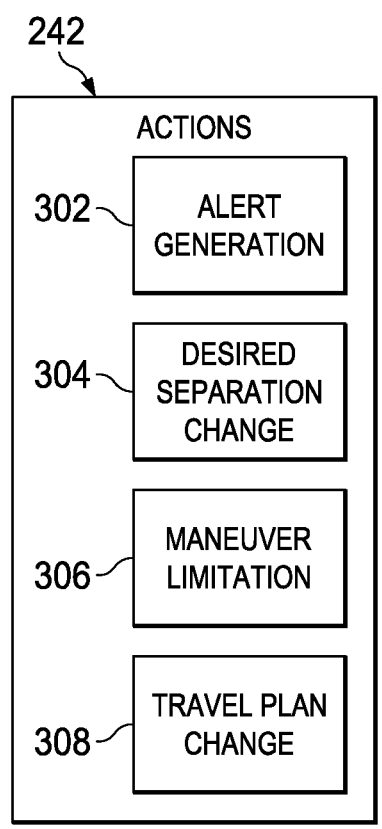
FIG. 3 is an illustration of a block diagram of actions that may be performed by a controller in accordance with an illustrative embodiment.

Turning now to FIG. 3, an illustration of a block diagram of actions that may be performed by a controller is depicted in accordance with an illustrative embodiment. As depicted, examples of actions 242 are shown in this figure. Actions 242 include alert generation 302, desired separation change 304, maneuver limitation 306, travel plan change 308, and other suitable actions.

Alert generation 302 involves generating an alert to an operator or other person. In these illustrative examples, the operator may be an operator of first vehicle 200, second vehicle 209, or some other vehicle. The operator may be a human operator, a program on a computer system, a hardware device, or some other operator that may control operations of first vehicle 200. The alert may be in the form of text, graphics, audio, or some other suitable form. The alert may provide an indication that a desired level of precision for identifying position 232 of first vehicle 200 relative to position 234 of second vehicle 209 may not have a desired level of accuracy.

In other cases, the alert may provide an indication that first inertial measurement unit enabled global positioning system device 212 is not operating as desired. First inertial measurement unit enabled global positioning system device 212 may not operate as desired if hardware, software, or both hardware and software within first inertial measurement unit enabled global positioning system device 212 are not operating as desired. In other cases, first inertial measurement unit enabled global positioning system device 212 may not operate as desired if wireless communications link 210 is lost or does not have a desired level of quality.

Desired separation change 304 may be a change in the distance between first vehicle 200 and second vehicle 209. For example, if first vehicle 200 is performing a maneuver with respect to second vehicle 209, the distance separating the vehicles may be changed if a desired accuracy of first information 228 generated by first inertial measurement unit enabled global positioning system device 212 is not as great as desired. For example, the change may require a greater distance between first vehicle 200 and second vehicle 209 if the two vehicles are both aircraft flying in a formation.

Maneuver limitations 306 may be a limitation to what maneuvers may be performed based on first information 228 not having a desired level of accuracy. For example, if first vehicle 200 is an unmanned aerial vehicle and second vehicle 209 is a surface ship and wireless communications link 210 is lost between first vehicle 200 and second vehicle 209, first information 228 may not have a desired level of accuracy. In this illustrative example, a remote operator of first vehicle 200 may be prohibited from landing first vehicle 200 on second vehicle 209.

This prohibition may last until first inertial measurement unit enabled global positioning system device 212 generates first information 228 with a desired level of accuracy. As a result, first vehicle 200 may abort a landing attempt and may be repositioned for another attempt when wireless communications link 210 again provides current position information 240 with a desired level of accuracy.

Travel plan change 308 involves changing the travel plan for a vehicle. A travel plan identifies a start location and an end location. Additionally, the travel plan also may include waypoints between the start location and the end location. The travel plan may provide a holding pattern, an alternate end location, or some other change to the current travel plan when a desired level of accuracy cannot be obtained for current position information 240.

Figure 4:
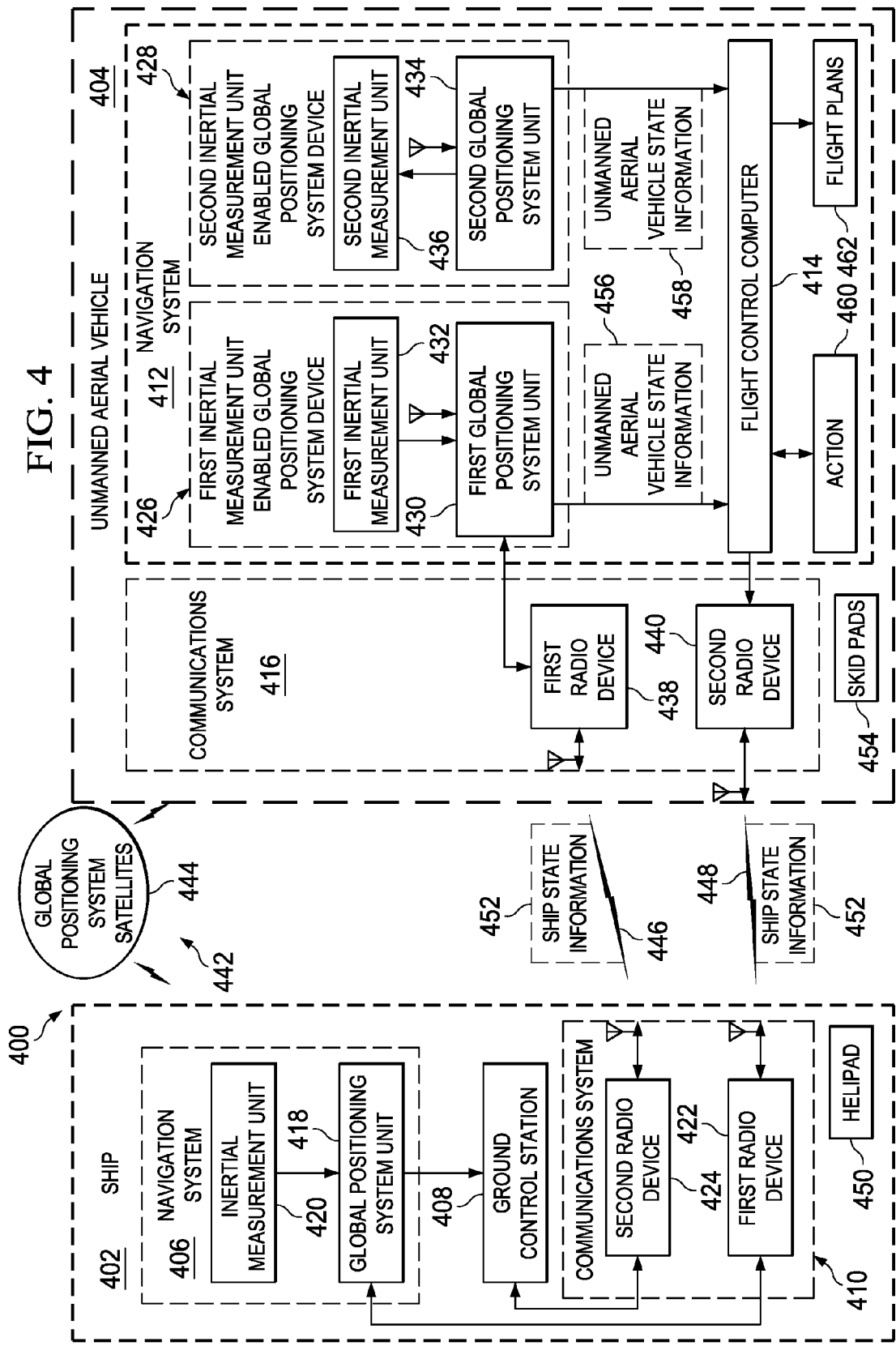
FIG. 4 is an illustration of a block diagram of a navigation environment in accordance with an illustrative embodiment.

Turning now to FIG. 4, an illustration of a block diagram of a navigation environment is depicted in accordance with an illustrative embodiment. In this depicted example, navigation environment 400 includes ship 402 and unmanned aerial vehicle 404. In this illustrative example, ship 104 in FIG. 1 is an example of an implementation for ship 402. Helicopter 106 in FIG. 1 is an example of an implementation for unmanned aerial vehicle 404.

Both ship 402 and unmanned aerial vehicle 404 may move in this illustrative example. For example, unmanned aerial vehicle 404 may land on ship 402 while ship 402 is moving on the water.

As depicted, ship 402 includes navigation system 406, ground control station 408, and communications system 410. Unmanned aerial vehicle 404 includes navigation system 412, flight control computer 414, and communications system 416.

Navigation system 406 in ship 402 includes global positioning system unit 418 and inertial measurement unit 420. Ground control station 408 is a computer system in this illustrative example. Communications system 410 in ship 402 includes first radio device 422 and second radio device 424. In this illustrative example, first radio device 422 has a lower bandwidth than second radio device 424.

As depicted, global positioning system unit 418 in ship 402 is connected to first radio device 422 and ground control station 408 is connected to second radio device 424. Additionally, ground control station 408 is connected to global positioning system unit 418 in navigation system 406 in this illustrative example.

Navigation system 412 in unmanned aerial vehicle 404 includes first inertial measurement unit enabled global positioning system device 426 and second inertial measurement unit enabled global positioning system device 428. As depicted, first inertial measurement unit enabled global positioning system device 426 includes first global positioning system unit 430 and first inertial measurement unit 432. First inertial measurement unit 432 is connected to first global positioning system unit 430. Second inertial measurement unit enabled global positioning system device 428 includes second global positioning system unit 434 and second inertial measurement unit 436. Second inertial measurement unit 436 is connected to second global positioning system unit 434.

In unmanned aerial vehicle 404, communications system 416 includes first radio device 438 and second radio device 440. Second radio device 440 has a higher bandwidth than first radio device 438 in these illustrative examples.

As depicted, first global positioning system unit 430 in first inertial measurement unit enabled global positioning system device 426 is connected to first radio device 438.

Flight control computer 414 is an example of an implementation for controller 202 in FIG. 2. Flight control computer 414 is connected to second radio device 440. Additionally, flight control computer 414 is connected to first global positioning system unit 430 in first inertial measurement unit enabled global positioning system device 426. Flight control computer 414 is also connected to second global positioning system unit 434 in second inertial measurement unit enabled global positioning system device 428.

In these illustrative examples, ship 402 and unmanned aerial vehicle 404 may receive global positioning system signals 442 from global positioning system satellites 444. Global positioning system 418 in navigation system 406 in ship 402 may use global positioning system signals 442 to generate position information about ship 402. First global positioning system unit 430 and second global positioning system unit 434 in navigation system 412 in unmanned aerial vehicle 404 may use global positioning system signals 442 to generate position information about unmanned aerial vehicle 404.

As depicted, ship 402 and unmanned aerial vehicle 404 may exchange information over wireless communications link 446 and wireless communications link 448. Wireless communications link 446 is established between first radio device 422 in ship 402 and first radio device 438 in unmanned aerial vehicle 404. Wireless communications link 448 is established between second radio device 424 in ship 402 and second radio device 440 in unmanned aerial vehicle 404.

These two wireless communications links are established to provide redundancy in case one of the wireless communications links does not function as desired. In this illustrative example, wireless communications link 446 is the primary communications link and wireless communications link 448 is the secondary or back up wireless communications link.

Additionally, wireless communications link 446 and wireless communications link 448 may be established using different frequencies in case environmental conditions cause a degradation in the quality of one of the wireless communications links over a particular frequency. In this manner, the other wireless communications link may remain unaffected or less affected by environmental conditions.

In this manner, the redundancy and use of different characteristics for wireless communications link 446 and wireless communications link 448 may provide increased reliability for exchanging information between ship 402 and unmanned aerial vehicle 404 during various operations where the need for information exchange is important. For example, exchanging position information during the approach and landing of unmanned aerial vehicle 404 on ship 402 may be more important than exchanging position information when unmanned aerial vehicle 404 is flying on a path performing surveillance.

In particular, the accuracy of identifying the position of unmanned aerial vehicle 404 may vary during different phases of flight for unmanned aerial vehicle 404. For example, increased accuracy in the identification of positions is more important during landing and takeoff of unmanned aerial vehicle 404 on ship 402 as compared to level flight or other phases of flight of unmanned aerial vehicle 404 that are farther away from ship 402.

In this illustrative example, the position of unmanned aerial vehicle 404 relative to the position of ship 402 may be considered an important situation in which the accuracy of these positions is needed for landing unmanned aerial vehicle 404 on ship 402 in a desired manner. In this situation, unmanned aerial vehicle 404 may be a helicopter landing on helipad 450 on ship 402 or taking off from helipad 450 on ship 402.

In this illustrative example, global positioning system unit 418 in navigation system 406 identifies the position of ship 402. In particular, global positioning system unit 418 identifies the position of global positioning system unit 418 on ship 402. This position is identified using global positioning system signals 442.

This position may be projected to different locations on ship 402. For example, the position may be projected to identify the position of helipad 450 on ship 402. Further, global positioning system unit 418 corrects the position of helipad 450 using error correction data. This error correction data may be derived from global positioning system signals 442 and from inertial measurement unit 420 in these illustrative examples.

Global positioning system unit 418 sends ship state information 452 to first inertial measurement unit enabled global positioning system device 426 in unmanned aerial vehicle 404 over wireless communications link 446. Ship state information 452 is an example of current position information 240 in FIG. 2. In this illustrative example, ship state information 452 may include at least one of position, velocity, attitude, heading, and error correction data.

First global positioning system unit 430 in first inertial measurement unit enabled global positioning system device 426 identifies the position of unmanned aerial vehicle 404 using global positioning system signals 442. In this example, the position identified is the position of first global positioning system unit 430 in unmanned aerial vehicle 404. This position may be projected to identify the position of any location on unmanned aerial vehicle 404. For example, this position may be adjusted to identify the position of skid pads 454 on unmanned aerial vehicle 404.

In this illustrative example, the position of skid pads 454 is adjusted using error correction data sent by global positioning system unit 418 instead of error correction data derived by first global positioning system unit 430 in first inertial measurement unit enabled global positioning system device 426. In this manner, the position of skid pads 454 is relative to the position of helipad 450. In this example, the accuracy in the position of helipad 450 and skid pads 454 may be in terms of centimeters.

In these illustrative examples, first global positioning system unit 430 sends unmanned aerial vehicle state information 456 to flight control computer 414. Unmanned aerial vehicle state information 456 may include at least one of position, velocity, attitude, and heading for unmanned aerial vehicle 404. Additionally, first global positioning system unit 430 also may send ship state information 452 to flight control computer 414. Unmanned aerial vehicle state information 456 includes the position of helipad 450 on ship 402 and the position of skid pads 454 on unmanned aerial vehicle 404. The position information also may include a velocity and heading of ship 402.

In these illustrative examples, flight control computer 414 is configured to perform an action in the event that the position of unmanned aerial vehicle 404 relative to ship 402 cannot be identified as accurately as desired from ship state information 452 and unmanned aerial vehicle state information 456 received from first inertial measurement unit enabled global positioning system device 426. The accuracy may be lost if wireless communications link 446 is lost or becomes degraded such that ship state information 452 cannot be received.

In this instance, flight control computer 414 may attempt to obtain ship state information 452 over wireless communications link 448. If ship state information 452 can be obtained over wireless communications link 448, flight control computer 414 may continue to identify the position of unmanned aerial vehicle 404 relative to ship 402 with a desired level of accuracy.

If ship state information 452 cannot be obtained from wireless communications link 446 or wireless communications link 448, flight control computer 414 may estimate a current position of helipad 450. This estimation may be made by using the last known velocity of ship 402 from the last time ship state information 452 was received.

For example, flight control computer 414 may identify a position of a first vehicle, of unmanned aerial vehicle 404, relative to a second vehicle, ship 402, using prior position information received from ship 402 and position information generated by unmanned aerial vehicle 404. The prior position information received from ship 402 may be the position of ship 402 previously received. The prior position information may also in include the velocity of ship 402. The position information may be generated by at least one of a global positioning system unit 434 and the second inertial measurement unit 436 in second inertial measurement unit enabled global positioning system device 428 in unmanned aerial vehicle 404.

Additionally, flight control computer 414 may be configured to receive unmanned aerial vehicle state information 458 from second global positioning system unit 434 in second inertial measurement unit enabled global positioning system device 428. Flight control computer 414 may compare the position of skid pads 454 as identified in unmanned aerial vehicle state information 456 with the position of skid pads 454 as identified in unmanned aerial vehicle state information 458.

If the difference between the two positions is greater than some threshold, first global positioning system unit 430 or some other component in first inertial measurement unit enabled global positioning system device 426 may not be operating as desired. In this situation, flight control computer 414 may use ship state information 452 and unmanned aerial vehicle state information 458 to identify the relative position of skid pads 454 relative to the position of helipad 450.

In still other illustrative examples, when the position of skid pads 454 relative to the position of helipad 450 cannot be identified with a desired level of accuracy, action 460 may be taken. Action 460 may be based on flight plans 462 for unmanned aerial vehicle 404.

Flight plans 462 include a complete mission for unmanned aerial vehicle 404. This mission may cover takeoff from helipad 450 to landing on helipad 450. Further, flight plans 462 also may include a flight plan for use when the position of skid pads 454 relative to the position of helipad 450 cannot be determined with a desired level of accuracy.

Additionally, the alternate flight plan may include holding or go around procedures that may be performed if wireless communications link 446 and wireless communications link 448 cannot provide ship state information 452. This alternate flight plan may be used until the wireless communications links can be re-established. In other cases, an alternate flight plan may be used that provides a different landing site other than helipad 450 on ship 402.

The illustration of the vehicles, navigation systems, and other components in FIGS. 2-4 are not meant to imply physical or architectural limitations to the manner in which illustrative embodiments may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more additional vehicles in addition to first vehicle 200 and second vehicle 209 in FIG. 2 may be present. These additional vehicles may also include navigation systems similar to navigation system 206 in FIG. 2. Further, in other illustrative examples, second inertial measurement unit enabled global positioning system device 213 may be omitted or the functions may be implemented in controller 202. In still other illustrative examples, functions performed by controller 202 in computer system 211 may be implemented in at least one of first position generator 216 and second position generator 221.

In another illustrative example, some of the functions performed by first global positioning system unit 430 may be implemented in a position identifier. In still other illustrative examples, communications system 410 and communications system 416 may include one or more radio devices in addition to the ones illustrated for ship 402 and unmanned aerial vehicle 404.

In yet another illustrative example, navigation system 412 on unmanned aerial vehicle 404 may be used in other types of vehicles to obtain a desired level of accuracy for position information about vehicles. For example, navigation system 412 may be implemented in vehicles such as, for example, a carrier, a spacecraft, a missile, a submarine, a car, a tank, a tanker aircraft, a train, and other suitable types of vehicles.

With respect to the implementation of components in first vehicle 200, the operations performed by the components may be implemented in the program code configured to be run on a processor unit when software is used to implement components. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

Figure 5:
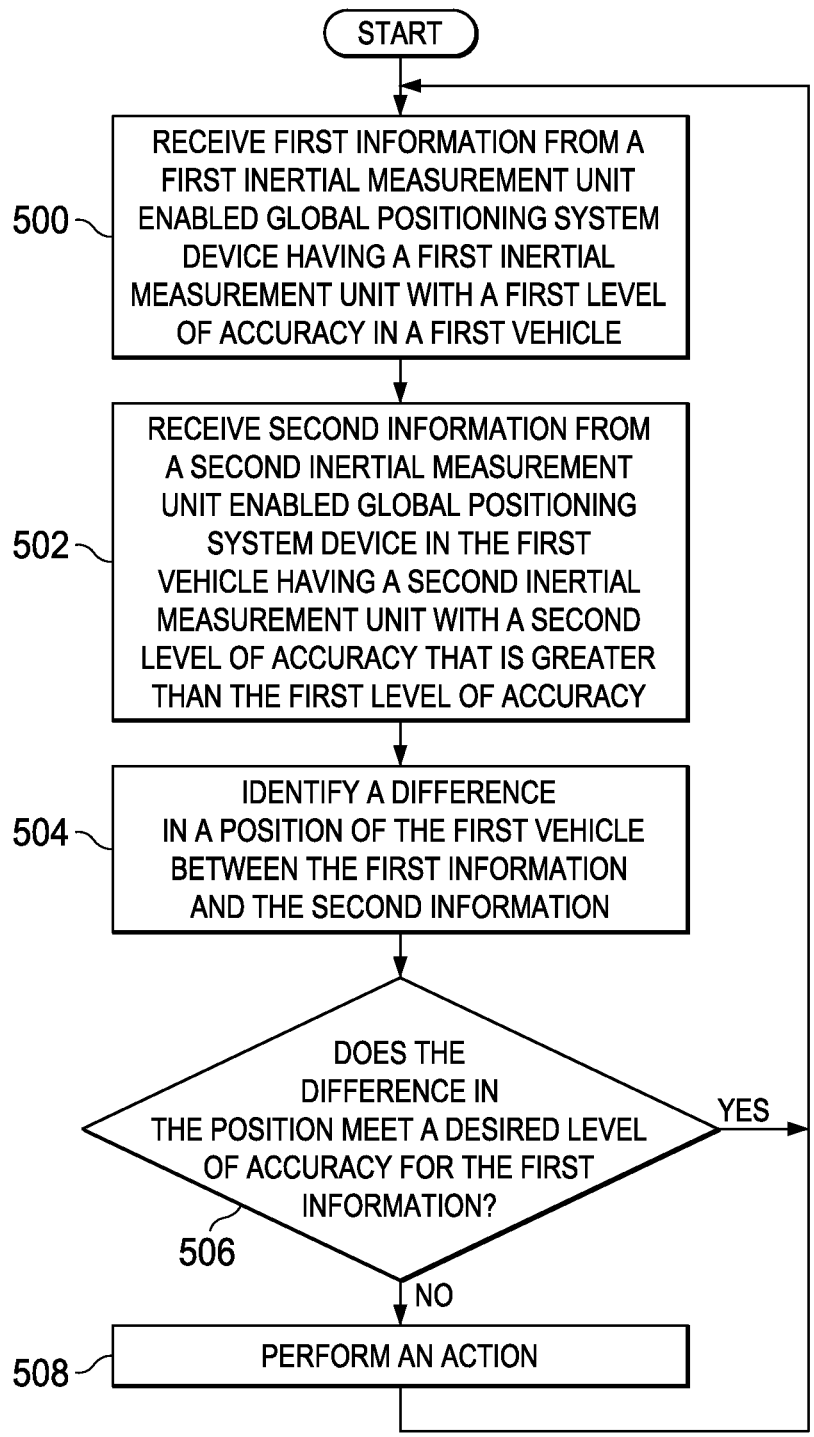
FIG. 5 is an illustration of a flowchart of a process for managing navigation information in accordance with an illustrative embodiment.

With reference now to FIG. 5, an illustration of a flowchart of a process for managing navigation information is depicted in accordance with an illustrative embodiment. The process illustrated in FIG. 5 may be implemented in navigation system 206 in FIG. 2.

The process begins by receiving first information from a first inertial measurement unit enabled global positioning system device having a first inertial measurement unit with a first level of accuracy in a first vehicle (operation 500). The first information is information that identifies a position of the first vehicle relative to a second vehicle.

The process then receives second information from a second inertial measurement unit enabled global positioning system device in the first vehicle having a second inertial measurement unit with a second level of accuracy that is greater than the first level of accuracy (operation 502). The second information is information that identifies the position of the first vehicle.

The process then identifies a difference in a position of the first vehicle between the first information and the second information (operation 504). A determination is made as to whether the difference in the position meets a desired level of accuracy for the first information (operation 506).

If the difference meets the desired level of accuracy, the process returns to operation 500 as described herein. Otherwise, an action is performed (operation 508) with the process then returning to operation 500 as described herein.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 6, an illustration of a data processing system is depicted in accordance with an illustrative embodiment. Data processing system 600 may be used to implement one or more hardware devices such as controller 202, first position generator 216, second position generator 221, ground control station 408, and flight control computer 414 in FIGS. 2 and 4. In this illustrative example, data processing system 600 includes communications framework 602, which provides communications between processor unit 604, memory 606, persistent storage 608, communications unit 610, input/output unit 612, and display 614. In this example, communication framework may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A navigation system comprising:
a first inertial measurement unit enabled global positioning system device in a first vehicle that has a first inertial measurement unit with a first level of accuracy, wherein the first inertial measurement unit enabled global positioning system device is configured to provide first information that identifies a position of the first vehicle relative to a second vehicle, and wherein the first inertial measurement unit enabled global positioning system device is configured to provide the first information that identifies the position of the first vehicle relative to the second vehicle using current position information received from the second vehicle;
a second inertial measurement unit enabled global positioning system device in the first vehicle having a second inertial measurement unit with a second level of accuracy that is greater than the first level of accuracy when a problem exists in at least one of the first inertial measurement unit enabled global positioning system device, a global positioning system device in the second vehicle, and communications between the first inertial measurement unit enabled global positioning system device and the second vehicle, wherein the second inertial measurement unit enabled global positioning system device is configured to provide second information that identifies the position of the first vehicle relative to the second vehicle, and the problem is an absence of a desired level of accuracy or a desired level of quality; and
a controller configured to perform an action when the problem exists in at least one of the first inertial measurement unit enabled global positioning system device, the global positioning system device in the second vehicle, and the communications between the first inertial measurement unit enabled global positioning system device and the second vehicle, wherein the action is selected from one of generating an alert, changing a desired separation, prohibiting a maneuver requiring a desired level of accuracy that cannot be provided without the current position information from the second vehicle, and changing a travel plan for the first vehicle.

2. The navigation system of claim 1, wherein the controller is configured to identify the position of the first vehicle relative to the second vehicle using the first information from the first inertial measurement unit enabled global positioning system device and current position information received from the second vehicle when the problem does not exist in at least one of the first inertial measurement unit enabled global positioning system device, the global positioning system device in the second vehicle, and the communications between the first inertial measurement unit enabled global positioning system device and the second vehicle.

3. The navigation system of claim 1 further comprising:
a communications system in the first vehicle configured to exchange information with the second vehicle.

4. The navigation system of claim 3, wherein the communications system comprises:
a first communications unit connected to the first inertial measurement unit enabled global positioning system device; and
a second communications unit connected to the second inertial measurement unit enabled global positioning system device.

5. The navigation system of claim 4, wherein the controller is configured to identify the position of the first vehicle relative to the second vehicle using current position information received from the second vehicle over the second communications unit when the current position information from the second vehicle is unavailable using the first communications unit.

6. The navigation system of claim 1, wherein the controller is located in at least one of a computer system in the first vehicle and the second inertial measurement unit enabled global positioning system device in the first vehicle.

7. The navigation system of claim 1, wherein the action comprises identifying the position of the first vehicle relative to the second vehicle using prior position information received from the second vehicle and position information generated by at least one of a global positioning system unit and the second inertial measurement unit in the second inertial measurement unit enabled global positioning system device.

8. The navigation system of claim 1, wherein the current position information received from the second vehicle comprises at least one of a three-dimensional location, an attitude, error correction information, a velocity, and a heading for the second vehicle.

9. The navigation system of claim 8, wherein the three-dimensional location is a location on the second vehicle.

10. The navigation system of claim 1, wherein the first vehicle and the second vehicle are selected from one of a ship, a carrier, an aircraft, a helicopter, an airplane, an unmanned aerial vehicle, a spacecraft, a missile, a submarine, a car, a tank, a tanker aircraft, and a train.

11. A method for processing navigation information in a navigation system, the method comprising:
receiving first information from a first inertial measurement unit enabled global positioning system device in a first vehicle that has a first inertial measurement unit with a first level of accuracy, wherein the first information identifies a position of the first vehicle relative to a second vehicle, and wherein the first inertial measurement unit enabled global positioning system device is configured to provide the first information that identifies the position of the first vehicle relative to the second vehicle using current position information received from the second vehicle;
receiving second information from a second inertial measurement unit enabled global positioning system device in the first vehicle having a second inertial measurement unit with a second level of accuracy that is greater than the first level of accuracy responsive to identifying that a problem exists in at least one of the first inertial measurement unit enabled global positioning system device, a global positioning system device in the second vehicle, and communications between the first inertial measurement unit enabled global positioning system device and the second vehicle, wherein the second information identifies the position of the first vehicle relative to the second vehicle, and the problem is an absence of a desired level of accuracy or a desired level of quality; and
performing an action when the problem exists in at least one of the first inertial measurement unit enabled global positioning system device, the global positioning system device in the second vehicle, and the communications between the first inertial measurement unit enabled global positioning system device and the second vehicle, wherein the action is selected from one of generating an alert, changing a desired separation, prohibiting a maneuver requiring a desired level of accuracy that cannot be provided without the current position information from the second vehicle, and changing a travel plan for the first vehicle.

12. The method of claim 11 further comprising:
identifying a difference in the position of the first vehicle between the first information and the second information; and
determining whether the difference in the position of the first vehicle meets a desired level of accuracy for the first information.

13. The method of claim 11 further comprising:
receiving current position information from the second vehicle; and
generating, by the first inertial measurement unit enabled global positioning system device, the first information that identifies the position of the first vehicle relative to the second vehicle using the current position information received from the second vehicle.

14. The method of claim 13, wherein the current position information is received from the second vehicle over a communications system comprising a first communications unit connected to the first inertial measurement unit enabled global positioning system device and a second communications unit connected to the second inertial measurement unit enabled global positioning system device.

15. The method of claim 13, wherein the current position information received from the second vehicle comprises at least one of a three-dimensional location, an attitude, error correction information, a velocity, and a heading for the second vehicle.

16. The method of claim 15, wherein the three-dimensional location is a location on the second vehicle.

17. The method of claim 11, wherein the action is selected from one of identifying the position of the first vehicle relative to the second vehicle using prior position information received from the second vehicle and position information generated by at least one of a global positioning system unit and the second inertial measurement unit in the second inertial measurement unit enabled global positioning system device.

18. The method of claim 11, wherein the first vehicle and the second vehicle are selected from one of a ship, a carrier, an aircraft, a helicopter, an airplane, an unmanned aerial vehicle, a spacecraft, a missile, a submarine, a car, a tank, a tanker aircraft, and a train.

* * * * *